L. Worster.
Harness Hook.
N° 93,788. Patented Aug. 17, 1869.

Witnesses:
Abrah. Worster
F. A. Morley

Inventor:
L. Worster

United States Patent Office.

LYNDON WORSTER, OF SYRACUSE, NEW YORK.

*Letters Patent No. 93,788, dated August 17, 1869.*

IMPROVEMENT IN COCK-EYES FOR HARNESS.

The Schedule referred to in these Letters Patent and making part of the same.

*To all whom it may concern:*

Be it known that I, LYNDON WORSTER, of Syracuse, in the county of Onondaga, and State of New York, have invented a new and improved Cock-Eye; and I do hereby declare that the following is a full, clear, and exact description thereof, which will enable those skilled in the art to make and use the same, reference being had to the accompanying drawings, forming part of this specification, in which—

Similar letters of reference indicate like parts.

This invention consists in constructing the eye of a cock-eye in such manner as to be capable of taking the form of a hook while being attached to or detached from the whiffletree; it otherwise having all the properties of an ordinary cock-eye, as hereinafter more fully described.

In the accompanying drawings—

A is the trace or tug;

B *b b* is the frame of the cock-eye; and

D is its eye or hook.

Figure 1:
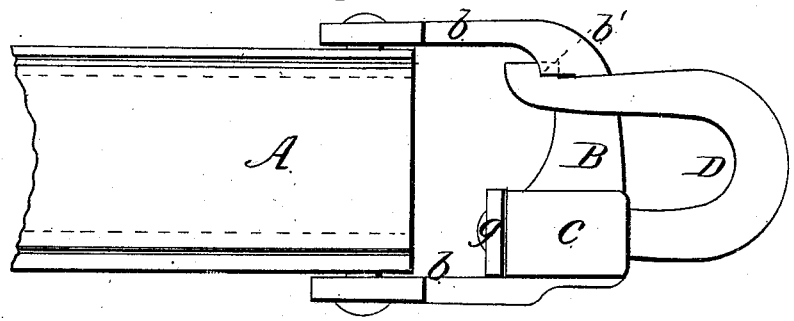
Figure 1 is a side view of my invention.
Figure 2:
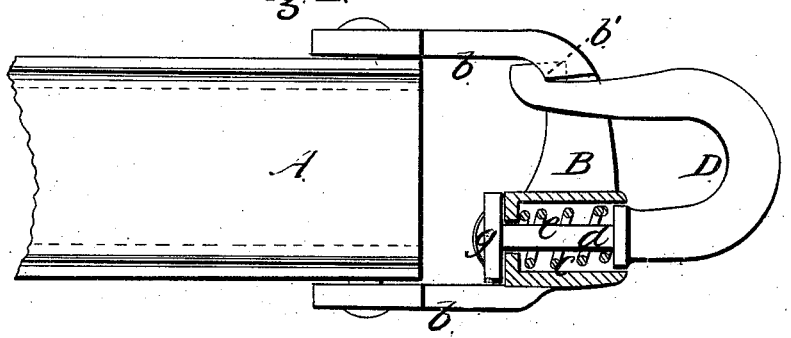
Figure 2 is a sectional view of the same.

The hook D is formed in a separate piece from the frame B, and has a shoulder and small shank, *d*, fig. 2, which occupy a chamber, *c*, in the said frame.

The end of the shank *d* passes entirely through the frame B, and a washer, *g*, is placed on the end of the shank to form a head, and is secured in place by upsetting the head of the shank.

The frame B has a recess formed by the lip or projection *b'*, with which the point of the hook engages.

To open the hook it is pressed inward, the collar *d* being forced into the chamber *c* until the point of the hook clears the catch *b'*; the hook is then turned sidewise, and is open.

To close it, the hook is pressed in as before, and the point of the hook dropped into the recess or catch *b'*.

The chamber *c* contains a spiral spring, *e*, which holds the point of the hook engaged with catch *b'*.

These cock-eyes can be used with any kind of whiffletree, but they are designed to be used with a whiffletree having eye-bolts instead of hooks; and when used in such connection, are entirely free from liability to become detached incidentally.

Having thus described my invention,

What I claim as new, and desire to secure by Letters Patent, is—

A cock-eye, composed of frame B *b' c*, and spring-hook or eye D *d*, substantially as herein described.

The above specification of my invention signed by me, this 18th day of March, 1869.

L. WORSTER.

Witnesses:
 WM. J. DODGE,
 F. A. MORLEY.